O. L. HUFFMAN.
TIRE FILLER.
APPLICATION FILED JAN. 27, 1920.
1,335,115.
Patented Mar. 30, 1920.
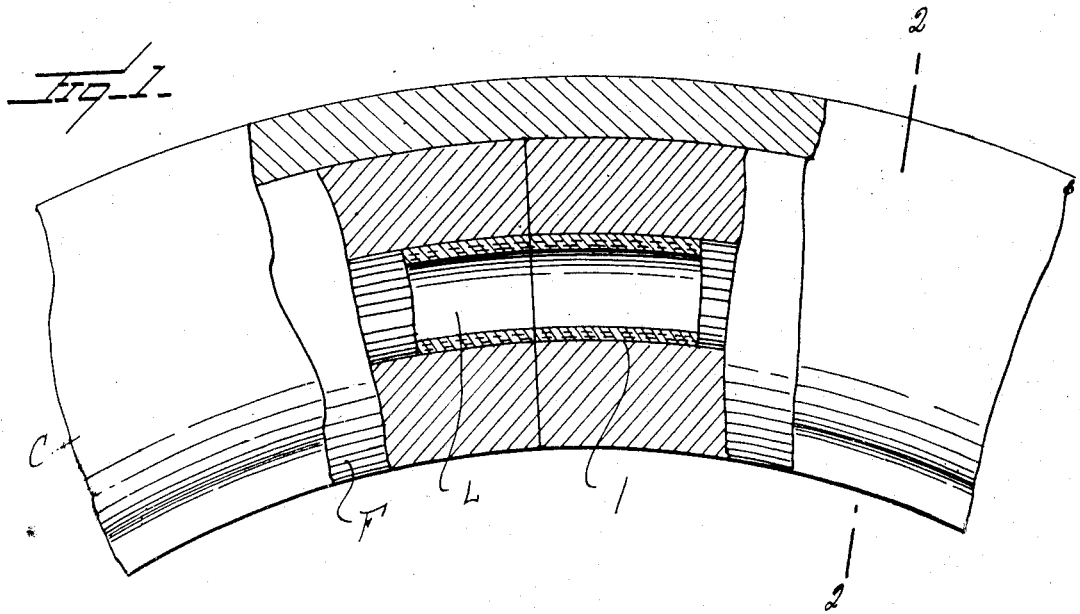
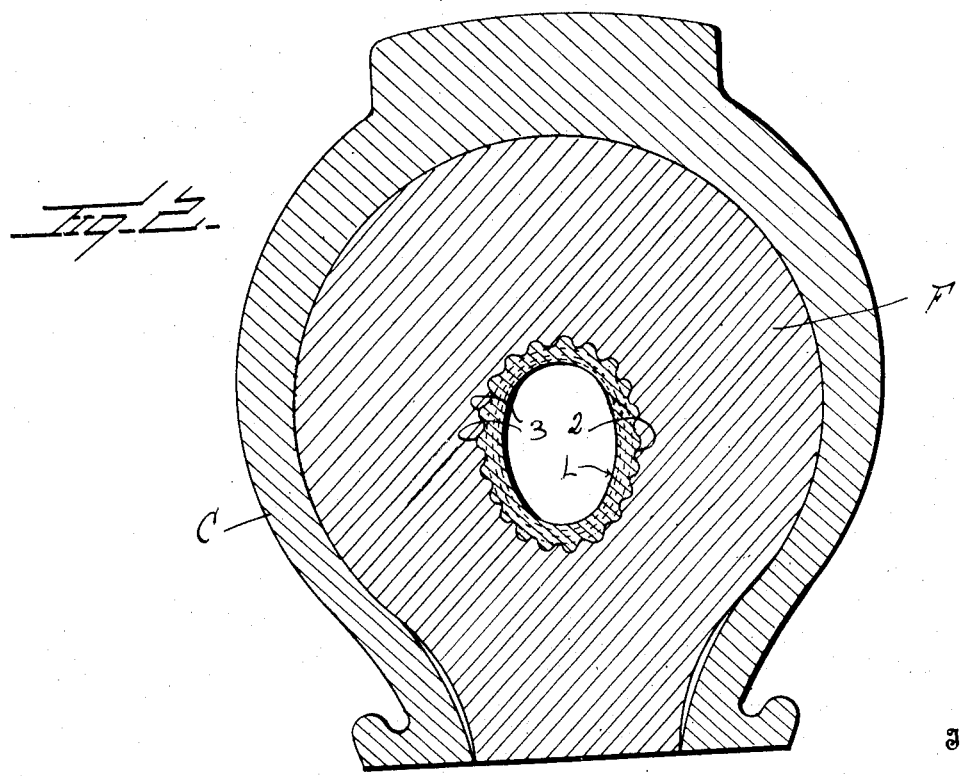
Inventor
O. L. Huffman
By Watson E. Coleman
Attorney

UNITED STATES PATENT OFFICE.

ORLA L. HUFFMAN, OF WEATHERFORD, TEXAS.

TIRE-FILLER.

1,335,115.

Specification of Letters Patent. Patented Mar. 30, 1920.

Application filed January 27, 1920. Serial No. 354,444.

*To all whom it may concern:*

Be it known that I, ORLA L. HUFFMAN, a citizen of the United States, residing at Weatherford, in the county of Parker and State of Texas, have invented certain new and useful Improvements in Tire-Fillers, of which the following is a specification, reference being had to the accompanying drawings.

This invention relates to certain improvements in tire fillers, and it is an object of the invention to provide a novel and improved device of this general character which serves to maintain the casing of a tire extended with the necessary resiliency and without requiring inflation.

Another object of the invention is to provide a novel and improved filler for a tire having an opening circumferentially disposed therethrough and wherein the wall of such opening is reinforced in a manner to prevent collapsing of the filler.

The invention consists in the details of construction and in the combination and arrangement of the several parts of my improved tire filler whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a fragmentary view partly in side elevation and partly in section of my filler constructed in accordance with an embodiment of my invention and in applied position; and Fig. 2 is an enlarged sectional view taken substantially on the line 2—2 of Fig. 1.

As disclosed in the accompanying drawings, C denotes a tire casing of any ordinary or preferred form and in which is adapted to be applied my improved filler F. In practice, it is my desire that the filler F consist of three sections, although I do not wish to be understood as limiting myself in this particular respect.

My improved filler F is formed of elastic material, such as rubber, rubber composition, or the like, and is adapted to fit snugly within the casing C. The filler F or more particularly each section thereof at substantially its axial center has disposed therethrough in a circumferential direction an opening 1 of any desired cross sectional configuration but herein disclosed as substantially oval in cross section.

The resiliency possessed by the filler F serves to maintain the casing C properly extended when the tire is in applied position, and said filler or core possesses sufficient elasticity to cause the casing C to properly stand out against the load imposed thereupon. The functioning of the filler F, however, is materially facilitated by the opening 1. It is of especial importance that central means be provided to prevent the portion of the filler F from breaking down and for this reason, I find it of utmost importance and advantage to employ in connection with the wall of the opening 1 a lining L. The lining L is tubular in form and has its walls produced of suitable non-elastic but flexible material preferably consisting of superimposed laminations of rubber and fabric. This lining L is molded within the filler F and after which molding operation, said lining and filler F are vulcanized together. It is also of particular advantage to have the peripheral face of the lining L serrated as indicated at 2 and said serrations preferably comprise a plurality of spaced ribs 3, or the like, extending in a direction circumferentially of the filler. These serrations 3 operate to maintain the lining L in a fixed or set position which in itself is of decided advantage in a filler of this particular kind.

From the foregoing description, it is thought to be obvious that a tire filler constructed in accordance with my invention is particularly well adapted for use by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice except as hereinafter claimed.

I claim:—

A filler for a tire adapted to snugly fit within a tire casing, said filler comprising a body of elastic material having an opening disposed circumferentially therethrough, and a lining for the wall of such opening, the outer wall of the lining being serrated.

In testimony whereof I hereunto affix my signature.

ORLA L. HUFFMAN.